United States Patent

Piasecki

[11] Patent Number: 6,098,921
[45] Date of Patent: Aug. 8, 2000

[54] ROTARY WING AIRCRAFT SUPPLEMENTARY POWER DRIVE SYSTEM

[75] Inventor: Frank N. Piasecki, Haverford, Pa.

[73] Assignee: Piasecki Aircraft Corp., Essington, Pa.

[21] Appl. No.: 09/305,948

[22] Filed: May 6, 1999

[51] Int. Cl.[7] .................................................. B64C 27/58
[52] U.S. Cl. .................. 244/17.19; 475/216; 74/665 M; 244/60
[58] Field of Search .................................. 244/60, 17.11, 244/17.19, 17.21, 17.27; 74/665 M, 665 N; 475/192, 330, 216; 416/170 R; 477/31

[56] References Cited

U.S. PATENT DOCUMENTS

| | | | |
|---|---|---|---|
| 3,002,710 | 10/1961 | Marchetti et al. | 244/60 |
| 3,255,825 | 6/1966 | Mouille et al. | 244/60 |
| 3,977,632 | 8/1976 | Watson | 244/60 |
| 4,489,625 | 12/1984 | White | 244/60 |
| 4,632,337 | 12/1986 | Moore | 244/60 |
| 4,811,627 | 3/1989 | Mouille | 244/60 |
| 5,271,295 | 12/1993 | Marnot | 244/60 |
| 5,782,433 | 7/1998 | Goi et al. | 244/60 |

Primary Examiner—Galen L. Barefoot
Attorney, Agent, or Firm—Willard M. Hanger

[57] ABSTRACT

A supplementary power drive system for providing additional power to the drive system of rotary wing aircraft that powers the aircraft main lifting rotor and tail mounted torque compensating rotor or propeller in a manner as avoids overloading the power capacity of the main rotor transmission. The supplementary power system, utilizing the power of a usually installed auxiliary power plant as a source of additional power, bypasses the main engine powered main rotor transmission in providing power to the tail mounted rotor or propeller and main rotor if the main transmission cannot absorb it. This is accomplished by incorporating a supplemental power transfer unit comprising a one-stage gear train into the tail rotor/propeller drive system that extends from the main transmission to the tail rotor/propeller in which a gear from the gear train connected to the main transmission and meshing with gears connected to the tail rotor/propeller drive shaft also is connected to the power output from the auxiliary power plant. This allows power from the auxiliary power plant to go directly to the tail rotor/propeller and bypass the main transmission, or is available to the main transmission for driving the main rotor in certain flight modes when the main rotor transmission can absorb the additional power.

8 Claims, 2 Drawing Sheets

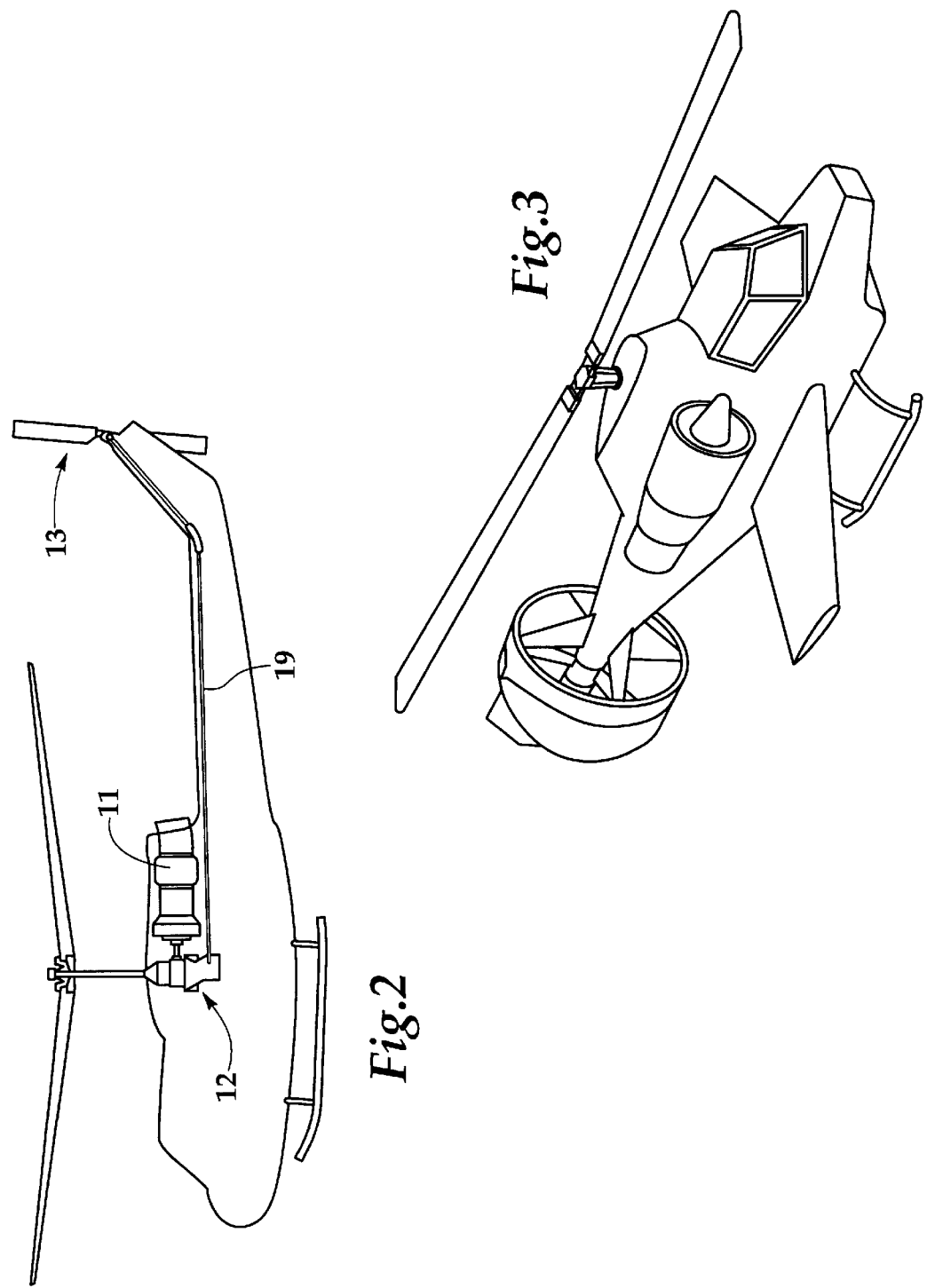

ROTARY WING AIRCRAFT SUPPLEMENTARY POWER DRIVE SYSTEM

This invention relates to a supplementary power drive system for providing additional power to the rotor drive system powering the drive shafts of rotary wing aircraft main lifting and tail mounted anti-torque propellers.

BACKGROUND OF THE INVENTION

In the development of fixed wing aircraft as requirements increase for greater weight and performance additional propulsive power is required. This could often be met by the relatively easy expedient of replacing the engines with higher powered engines. However, for rotary wing aircraft this relatively simple expedient is not feasible in most instances since additional power from higher powered engines for increasing aircraft performance must pass through the main rotor transmission which has an upper limit of the amount of power which can be absorbed and is a limiting factor in adding additional power to the main rotor for propulsion and lift. Main rotor transmissions comprise complex power gear trains with severe limitations in the amount of horsepower that the power train can absorb and redesigning a main rotor transmission to accommodate even moderate increases in power is a major and expensive undertaking.

SUMMARY OF THE INVENTION

The supplementary power drive system of this invention bypasses this power absorbing limitation of the main rotor transmission by utilizing the usually installed auxiliary power turbine, normally used for starting the main engine turbines, as a source of additional shaft power to the rotor drive system for driving the tail mounted torque compensating propeller as well as the main rotor if the main rotor transmission can absorb the increased power. This is accomplished by incorporating a supplemental power transfer unit comprising a one-stage gear train into the tail mounted propeller drive system that drives the tail propeller and extends between the main rotor transmission and the tail propeller and in which a gear of the train connected to the main transmission and meshing with gears connected to the tail propeller drive shaft also is connected to the power output of the auxiliary power turbine. This allows power from the auxiliary power plant to go directly to the tail propeller and bypass the transmission, or is available to the main transmission for driving the main rotor in certain flight modes when the main rotor transmission can absorb the additional power.

Whereas the supplementary power driving system of this invention can be advantageously used in providing additional power to the power drive system of any type of single rotary wing aircraft having a tail mounted rotor for counteracting the torque of the main rotor, this invention is most advantageous when incorporated into the power drive system of compound helicopters having a fixed wing providing a lift in forward flight and a vectored thrust ducted propeller tail assembly, sometimes referred to as a "ring tail." Aircraft of this type are described in U.S. Pat. Nos. 3,138,349; 3,222,012; 3,241,791; 3,260,482; 4,905,932; 5,123,613; 5,131,603 and 5,227,381. The tail assembly of these "ring tail" compound helicopters have a propeller rotatable contained within a duct incorporating rotatable vanes or other provisions for directing the propeller slip stream transversely of the aircraft to establish lateral thrust for counteracting rotor torque in hovering or slow speed flight or directing the slip stream rearwardly of the aircraft to provide forward propulsive thrust in forward flight. For hovering flight, although the major portion of the main engine power passing through the main rotor transmission is used to drive the main rotor, a portion of the power is used to drive the tail propeller for anti-torque purposes. Supplying auxiliary power directly to the tail propeller increases the power available to the main rotor for hovering flight without overloading the main rotor transmission. Similarly, thrust for forward high speed flight being primarily or entirely provided by the tail rotor, supplying power from the auxiliary power plant directly to the tail rotor makes this increased power directly available for forward flight without going through the main rotor transmission. For a better understanding of this invention as it relates to compound "ring tail" helicopters, the contents of the applicant's U.S. Pat. No. 4,905,932 are incorporated in this application.

BRIEF DESCRIPTION OF THE DRAWINGS

FIG. 2 is a side elevation, partially in section, of a conventional single rotor helicopter having a tail rotor mounted for rotation about a transversely extending axis for counteracting main rotor torque and is an example of helicopters for utilizing the supplementary power drive system of this invention.

FIG. 3 is a perspective view of the compound helicopter with a vectored thrust ducted propeller tail assembly described in U.S. Pat. No. 4,905,932 and is the category of helicopters in which the supplementary power drive of this invention is most useful.

DETAILED DESCRIPTION OF THE INVENTION

Figure 1:
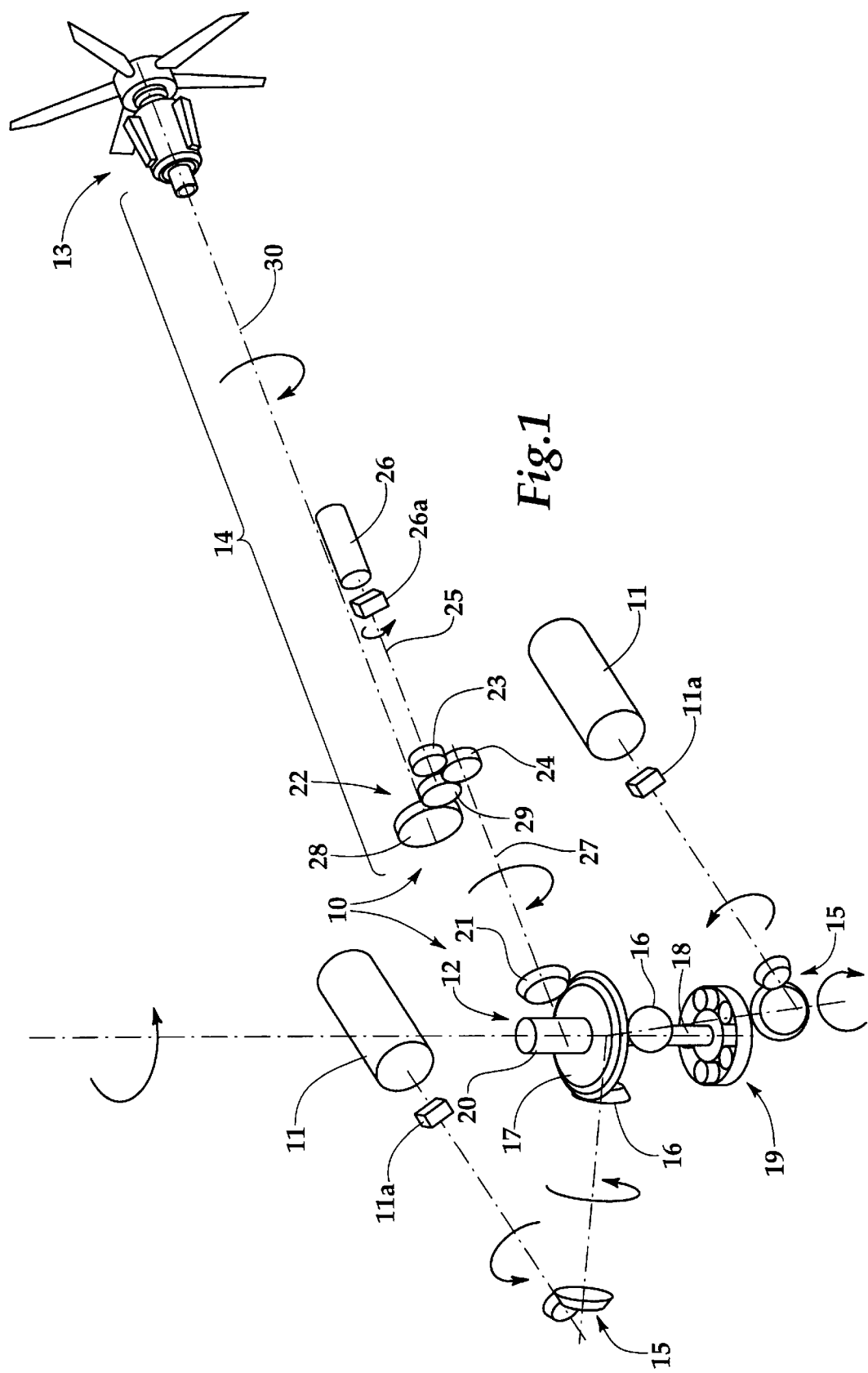
FIG. 1 is an isometric schematic drawing of a rotary wing aircraft power drive system incorporating the supplementary power unit drive system of the invention.

FIG. 1 schematically illustrates the components of a single rotor, rotary wing aircraft power drive system 10 to which this invention is applicable in which a pair of main engine turbines 11 provide power to the main transmission 12 for driving the main rotor (not illustrated) and for driving the tail propeller 13 through a tail propeller drive system 14 extending between the main transmission 12 and the tail propeller 13. The tail propeller 13 shown in FIG. 1 represents the shrouded propeller of a vectored thrust ducted propeller compound helicopter that provides transverse thrust for counteracting main rotor torque and forward propulsive thrust for forward flight of the type illustrated in FIG. 2. For purposes of describing the application of this invention to conventional single main rotor helicopters having a tail rotor of the type illustrated in FIG. 2, propeller 13 of FIG. 1 is also intended to represent the rotor mounted on the tail of conventional single rotor helicopters. Therefore, for purposes of describing this invention, the terms "tail propeller" and "tail rotor" are synonymous in meaning. Referring specifically to FIG. 1, power from the main turbine engines 11 transmitted through overrunning clutches 11a and reduction gear pinions 15 and drive pinions 16 drives the transmission main bevel gear 17 coupled to a drive shaft 18 driving the planetary gear train 19 that connects to and drives the drive shaft 20 of the main rotor (not illustrated) at the design RPM. The tail propeller drive system 14 receives power from the main transmission 12 through a drive pinion 21 meshing with the transmission main bevel gear 17 and delivers it to the tail propeller 13. In conventional single main and tail rotor helicopters and compound shrouded propeller tail duct "ring tail" helicopters, to which the supplementary drive system of this invention is applicable, the tail propeller drive system indicated by the spread interval 14 in FIG. 1 normally comprises an integral shaft arrangement 14 connecting between a main rotor transmission 12 powered by engine 11 and the tail rotor 13 as indicated in FIG. 2.

It is common practice to utilize an installed auxiliary power plant, usually a turbine, for starting the main engines of conventional single rotor and compound "ring tail" helicopters by connecting the auxiliary power turbine into the main engine drive shaft system or bleeding compressed air from the auxiliary power plant to start the main engines. The supplementary power system of this invention makes power from the auxiliary power plant available to the rotor main drive system of single rotor helicopters without overloading the main rotor transmission by introducing this power from the auxiliary power plant into the rotor main drive system through the tail propeller drive system 14 into which the supplemental power unit 22 comprising the single stage gear train 22 is incorporated. This supplemental power unit gear train 22 comprises a pair of superimposed meshing spur gears 23 and 24 of which a first one 23 of the gear pairs is connected to the power output shaft 25 of the auxiliary power turbine 26 through an overrunning clutch 26a, a second one 24 of the gear pairs is connected to the transmission connection side 27 of the tail propeller drive system 14 and a third spur gear 28 of the gear train 22 meshing with the second gear 24 of the gear train through an idle gear 29 has a connection 30 to the drive shaft of the tail propeller 13. This allows power from the auxiliary power plant to go directly to the tail propeller, bypassing the main rotor transmission entirely or, in certain flight modes a portion can be used to drive the main rotor since the tail propeller drive system 14 and the main transmission 12 are interconnected throughout all flight modes of the helicopter. Thus, the power available to the main rotor can be increased for hovering in all types of single rotor helicopters without overloading the main transmission since power for anti-torque is transmitted directly to the tail propeller. In compound "ring tail" helicopters power available for forward flight is increased, particularly for high speed, without overloading the main transmission since forward propulsion is provided primarily or entirely by the tail propeller.

It should be understood that the foregoing disclosure involves a preferred and typical embodiment of the invention and that numerous modifications or alterations therein would be obvious and made by those of normal skill in the art without departing from the spirit and scope of the invention as set forth in the appendant claims.

What is claimed is:

1. A supplementary power drive system for providing additional power to a rotary wing aircraft rotor drive system driving the aircraft lifting rotor and tail mounted torque compensating rotor from power received from an engine powered main transmission having a direct connection to a drive shaft of the lifting rotor and a power take-off connection connected to a tail rotor drive system of the aircraft extending between said main transmission and a drive shaft of the tail rotor, said supplementary power drive system comprising:

an auxiliary power plant adapted for mounting on said aircraft and power transfer means connected to said auxiliary power plant and incorporated into said tail rotor drive system between said transmission power take-off connection and said tail rotor drive shaft comprising:

a gear train comprising a plurality of gears arranged in series driving communication with one another and in which respective ones of a pair of gears of said train are rotatably connected respectively through said tail rotor drive system to said tail rotor drive shaft and to said transmission power take-off connection and a third one of said gears of said train in series driving communication with said pair of gears is rotatably connected to the output of said auxiliary power plant, whereby power from said auxiliary power plant is delivered by said third and pair of gears of said gear train through said tail rotor drive system to said tail rotor drive shaft and transmission in amounts as are absorbable by the respective tail and lifting rotors in establishing the desired aircraft flight mode.

2. The supplementary power drive system of claim 1 wherein said pair of gears are adjacently located and said third gear is adjacently located in driving communication with one of said pair of gears.

3. The supplementary power drive system of claim 2 wherein said third gear is adjacent to in direct driving connection with the gear of said gear pair that is rotatably connected to said transmission power take-off connection.

4. The supplementary power drive system of claim 3 wherein said gears are spur gears and an idler gear is interposed between each of said gears of said gear pair.

5. In a rotary wing aircraft having a rotor drive system comprising a main engine powered transmission directly connected to a drive shaft of the aircraft lifting rotor and indirectly connected to a drive shaft of the aircraft tail mounted torque compensating rotor through a tail rotor drive system of the aircraft extending between a power take-off connection of said transmission and the tail mounted rotor drive shaft, a supplementary power drive system for providing additional power to the aircraft rotor drive system comprising:

an auxiliary power plant mounted on the aircraft and power transfer means having a connection to said auxiliary power plant and incorporated into said tail rotor drive system between said transmission power take-off connection and said tail rotor drive shaft comprising:

a gear train comprising a plurality of gears arranged in series driving communication with one another and in which respective ones of a pair of gears of said train are rotatably connected respectively through said tail rotor drive system to said tail rotor drive shaft and to said transmission power take-off connection and a third one of said gears of said train in series driving communication with said pair of gears is rotatably connected to the output of said auxiliary power plant, whereby power from said auxiliary power plant is delivered by said third and pair of gears of said gear train through said tail rotor drive system to said tail rotor drive shaft and transmission in amounts as are absorbable by the respective tail and lifting rotors in establishing the desired aircraft flight mode.

6. The supplementary power drive system of claim 5 wherein said pair of gears are adjacently located and said third gear is adjacently located in driving communication with one of said pair of gears.

7. The supplementary power drive system of claim 6 wherein said third year is adjacent to in direct driving connection with the gear of said gear pair that is rotatably connected to said transmission power take-off connection.

8. The supplementary power drive system of claim 7 wherein said gears are spur gears and an idler gear is interposed between each of said gears of said gear pair.

* * * * *